US007836562B2

(12) United States Patent
Franklin et al.

(10) Patent No.: US 7,836,562 B2
(45) Date of Patent: Nov. 23, 2010

(54) LOCKING CLIP FOR A BILLBOARD SIGN TENSIONING SYSTEM

(75) Inventors: Robert Lee Franklin, Snellville, GA (US); Christopher Jonathan Adams, Hoschton, GA (US); Perry Steve Hart, Comer, GA (US); Jack Bishop, Hull, GA (US)

(73) Assignee: Formetco, Inc., Duluth, GA (US)

( * ) Notice: Subject to any disclaimer, the term of this patent is extended or adjusted under 35 U.S.C. 154(b) by 0 days.

(21) Appl. No.: 12/104,257

(22) Filed: Apr. 16, 2008

(65) Prior Publication Data

US 2008/0250613 A1 Oct. 16, 2008

Related U.S. Application Data

(60) Provisional application No. 60/912,058, filed on Apr. 16, 2007.

(51) Int. Cl.
*F16B 2/00* (2006.01)

(52) U.S. Cl. ............................ 24/346; 24/349; 24/459; 40/603

(58) Field of Classification Search ................... 24/459, 24/460, 477, 194, 171, 346, 347, 349; 40/603
See application file for complete search history.

(56) References Cited

U.S. PATENT DOCUMENTS

| | | | |
|---|---|---|---|
| 1,474,692 | A | 11/1923 | Thurau |
| 2,866,249 | A | 12/1958 | Normandin |
| 4,686,748 | A | 8/1987 | Kaivanto |
| 4,809,408 | A | 3/1989 | Abrahamson |
| 5,178,306 | A | 1/1993 | Petrou |
| 6,789,295 | B1 | 9/2004 | Svensson |

FOREIGN PATENT DOCUMENTS

| | | |
|---|---|---|
| GB | 2215766 A | 9/1989 |
| JP | 06094010 | 4/1994 |
| WO | 03098055 A1 | 11/2003 |

OTHER PUBLICATIONS

Search Report and Written Opinion for International Patent Application No. PCT/US2008/060505; Aug. 13, 2008.

*Primary Examiner*—James R Brittain
(74) *Attorney, Agent, or Firm*—Jason A. Bernstein; Barnes & Thornburg LLP

(57) ABSTRACT

A clip for use in a cable tensioning system, comprising (i) a base plate comprising a generally flat base member having a top surface having a plurality of surface irregularities, a bottom surface, a front edge and a rear edge, and a pair of opposing tensioning arms extending from the top surface; and, (ii) a top plate comprising a top surface, a bottom surface, a front edge and a rear edge, a lip protruding from a top surface thereof having a channel defined therein, wherein the top plate is adapted to secure an edge of a substantially flat medium between the base plate and the top plate when the top plate and the bottom plate are in an engaged relationship, and wherein the channel can receive a portion of a cable.

13 Claims, 6 Drawing Sheets

LOCKING CLIP FOR A BILLBOARD SIGN TENSIONING SYSTEM

CROSS REFERENCE TO RELATED APPLICATION

This patent application claims priority to U.S. Provisional Application No. 60/912,058, filed Apr.16, 2007, the disclosure is incorporated herein by reference In its entirety.

FIELD

The present disclosure relates to locking clips for holding and maintaining a generally flat sheet of material in a tensioned or stretched condition on a billboard.

BACKGROUND

Large printed vinyl sheets have generally replaced pasted paper signs in the outdoor advertising industry. Installation of large printed vinyl sheets requires two or more workers who push light weight fiberglass or similar non-conductive rods through pockets heat-sealed in each of the four end surfaces of a sheet, which forms the advertising face of a billboard.

The vinyl sheets typically have to be hung down the top of a billboard after the top rods are secured to the billboard frame and pulled or tensioned horizontally and vertically across the metal backing of the billboard. Various tensioning devices have been used and generally require at least two workers to complete the installation process, taking on average approximately 20 to 30 minutes or more from beginning to end.

The industry recently developed light weight vinyl sheets which cost less but are not as strong as the vinyl in predominate use today. Its lighter weight and lesser strength make it unsuitable for heat-sealing pockets and more subject to tearing from excess tensioning and repeated installations and removal. Printed vinyl sheets are frequently moved from one billboard location to another to save on printing and material costs.

U.S. Pat. No. 6,789,295 discloses a clamp apparatus for application to a plate, sheet, fabric or thin film by gripping two opposite sides of the object. Additionally, the only accommodation for a cable connection will place this apparatus at a 90 degree angle to the face of a billboard panel, which may result in twisting and wrinkling of the vinyl sheet.

It would be desirable to have a clip which could attach to a laterally running cable and which will minimize or eliminate twisting and wrinkling of the vinyl sheet. It would be further desirable to have a clip which would allow application to a cable running parallel to the face of the clip.

SUMMARY

The present disclosure provides a clip for use in a cable tensioning system. One aspect of the present disclosure provides a clip for use in a cable tensioning system, comprising (i) a base plate comprising a generally flat base member having a top surface having a plurality of surface irregularities, a bottom surface, a front edge and a rear edge, and a pair of opposing tensioning arms extending from the top surface; and, (ii) a top plate comprising a top surface, a bottom surface, a front edge and a rear edge, a lip protruding from a top surface thereof having a channel defined therein, wherein the top plate is adapted to secure an edge of a substantially flat medium between the base plate and the top plate when the top plate and the bottom plate are in an engaged relationship, and wherein the channel can receive a portion of a cable.

BRIEF DESCRIPTION OF THE DRAWINGS

Exemplary embodiments of the present invention are illustrated in the drawings in which like reference characters designate the same or similar parts throughout the figures of which.

DETAILED DESCRIPTION

The present disclosure relates to a locking clip for a conventional cable tensioning system which, after initial installation, allows a single worker to install a large printed vinyl sheet in less time than it takes two or more workers to perform the same installation using the rod and pocket tensioning system. In a typical installation, a cable is hung on slides along the four sides of a billboard face, hidden from view by the face frame. Clips, which lock onto the edge of a vinyl sheet as a result of a friction-based two piece device, are attached to the vinyl sheet at selected intervals approximately 2-3 feet apart. The clip has a lip through which the cable passes. As tension is increased on the cable by means of a spring-loaded single arm locking mechanism the grip of the clip on the vinyl sheet is increased.

Figure 1:
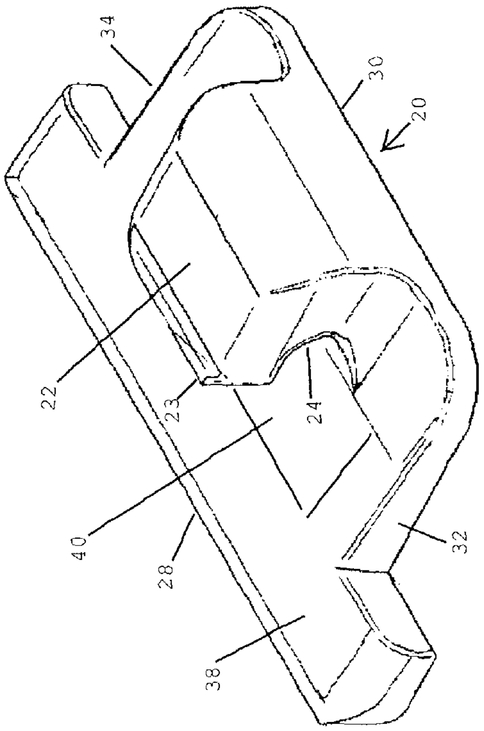
FIG. 1 is a perspective view of a cable pull according to one exemplary embodiment.
Figure 3:
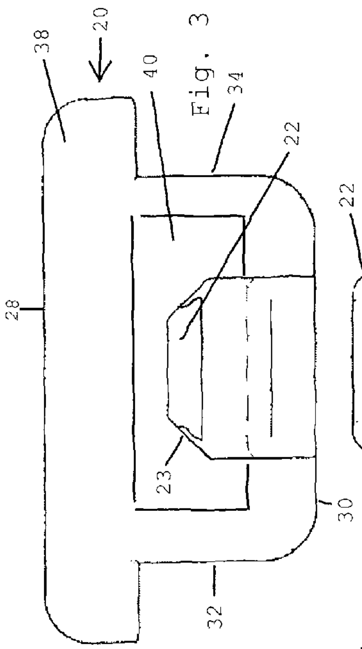
FIG. 3 is a top plan view of the cable pull of FIG. 1.
Figure 4:
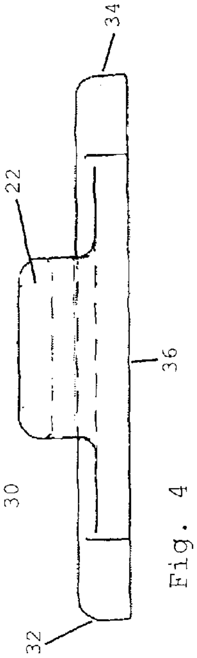
FIG. 4 is a rear elevation view of the cable pull of FIG. 1.
Figure 2:
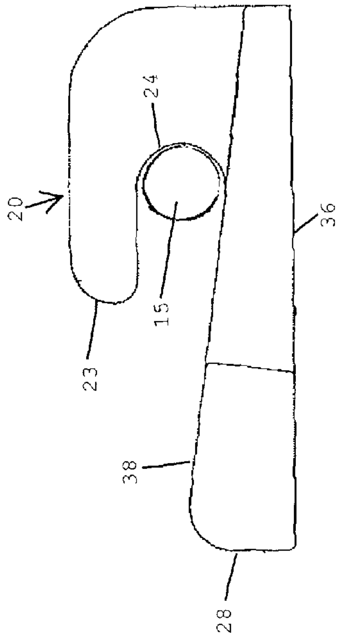
FIG. 2 is a left side elevation view of the cable pull of FIG. 1.
Figure 3A:
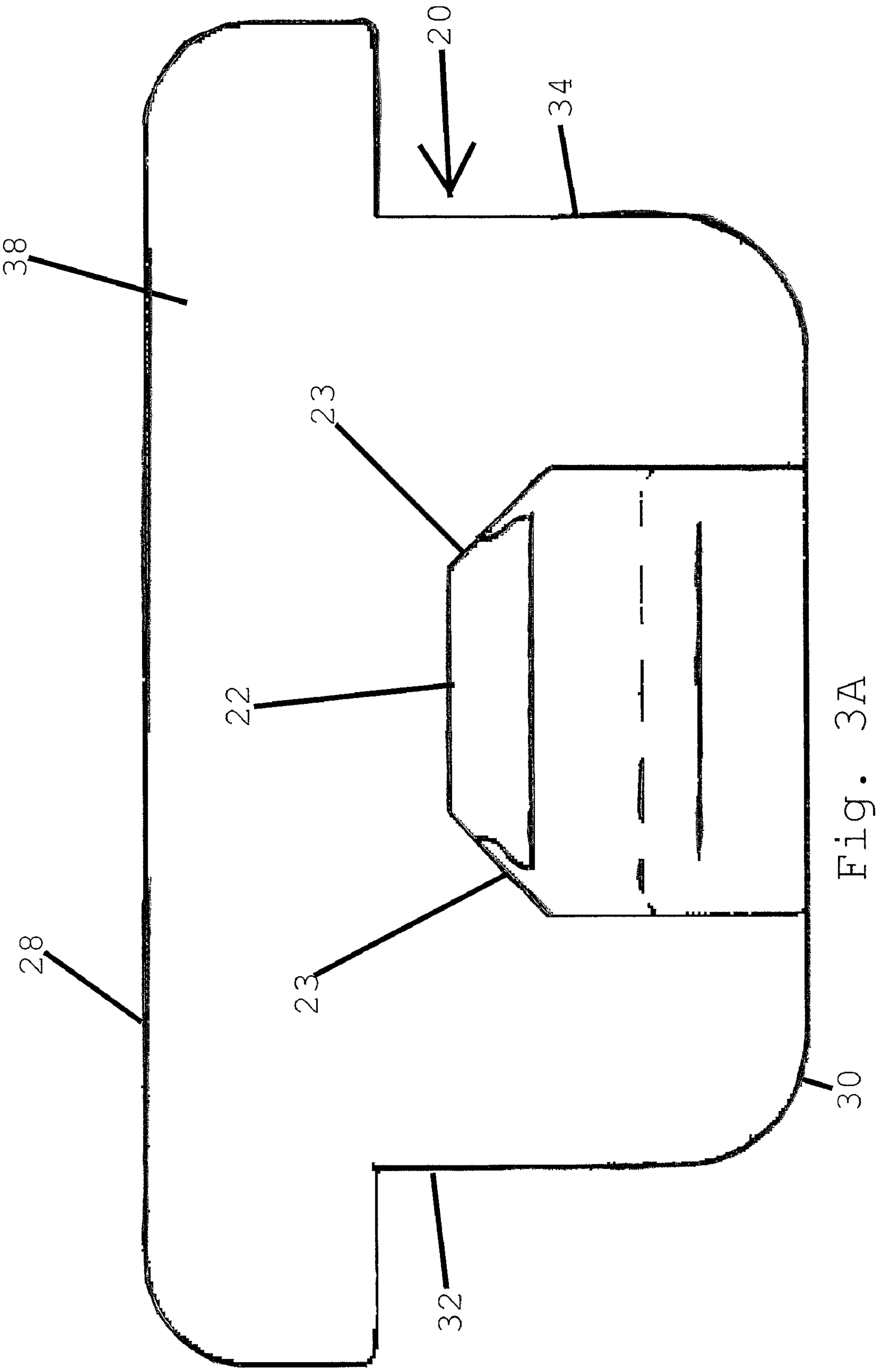
FIG. 3A is a top plan view of a variation of the cable pull of FIG. 3.

FIGS. 1-5 show one exemplary embodiment of a clip apparatus 10 for tensioning a cable 15. The clip apparatus 10 comprises a cable pull 20 and a base plate 50. The clip parts may be made of a composite nylon material which provides the strength required to sustain constant tensioning pressure and withstand long-term outdoor exposure to heat, cold, sun, rain, and non-atmospheric conditions such as excessive installation pressure, tensioning pressure, and corrosive elements. Alternatively, the clip apparatus 10 may be made of other suitable polymers, metal, alloy, ceramic, wood, combinations thereof, and the like. The cable pull 20 and base plate 50 may be made of the same or different materials. The cable pull 20 has a lip 22 with a rounded interior recess portion or channel 24 through which a cable 15 passes and can be retained. The lip 22 has top corners 23. The cable pull 20 has a front edge 28, rear edge 30, first side 32, second side 34, bottom surface 36, and top surface 38. As shown in FIG. 2, the thickness of the cable pull 20 preferably tapers from the front edge 28 toward the rear edge 30. The tapering may be from edge to edge, or, alternatively, the tapering can be a portion of the distance from edge to edge. The tapering allows the cable 15 to slide within the lip 22. Free or substantially unimpeded lateral movement of the cable 15 within the lip 22 is preferable for smooth operation of the cable tensioning system. Optionally, the cable pull 20 may also have an open area 40. In a variation of this embodiment (shown in FIG. 3A) the corners 23 are angled or beveled, preferably at about 45 degrees (although other angles are usable), to facilitate the attachment of the assembled clip apparatus 10 to the cable 15.

Figure 5:
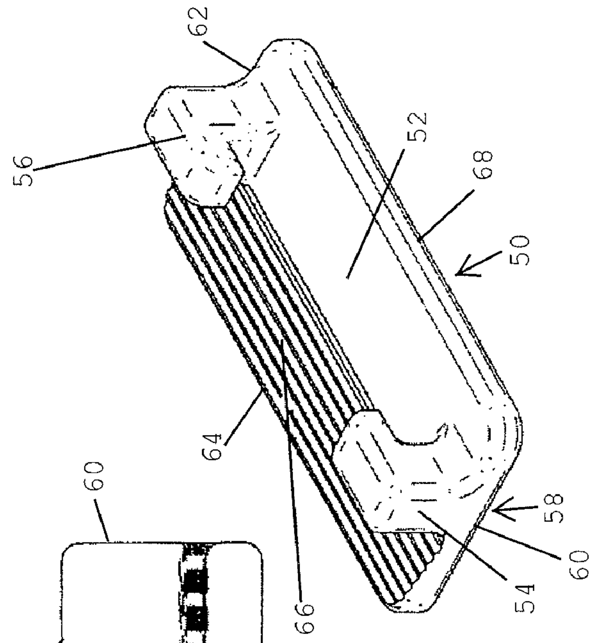
FIG. 5 is a perspective view of the base plate of one exemplary embodiment.
Figure 6:
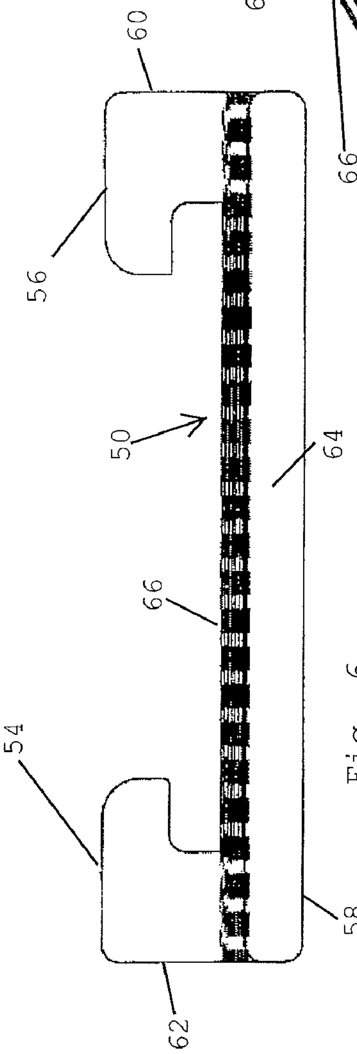
FIG. 6 is a front elevation view of the base plate of FIG. 5.
Figure 7:
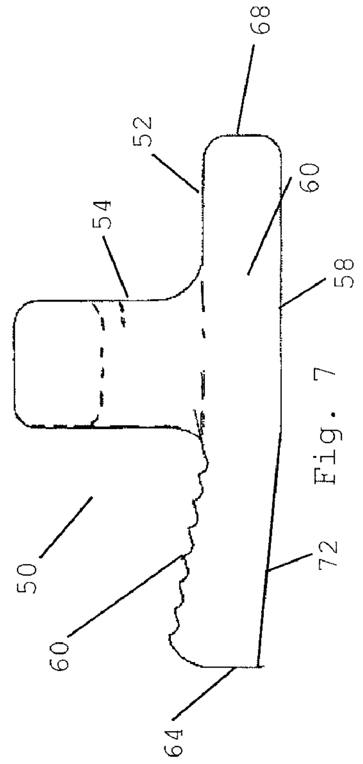
FIG. 7 is a left side view of the base plate of FIG. 5.
Figure 8:
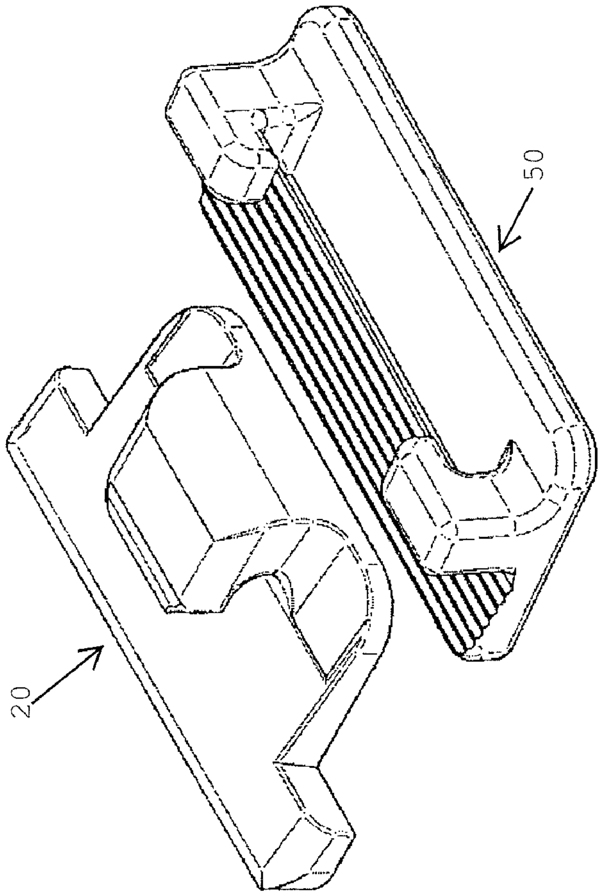
FIG. 8 is perspective view of the cable pull positioned for insertion into the base plate.
Figure 9:
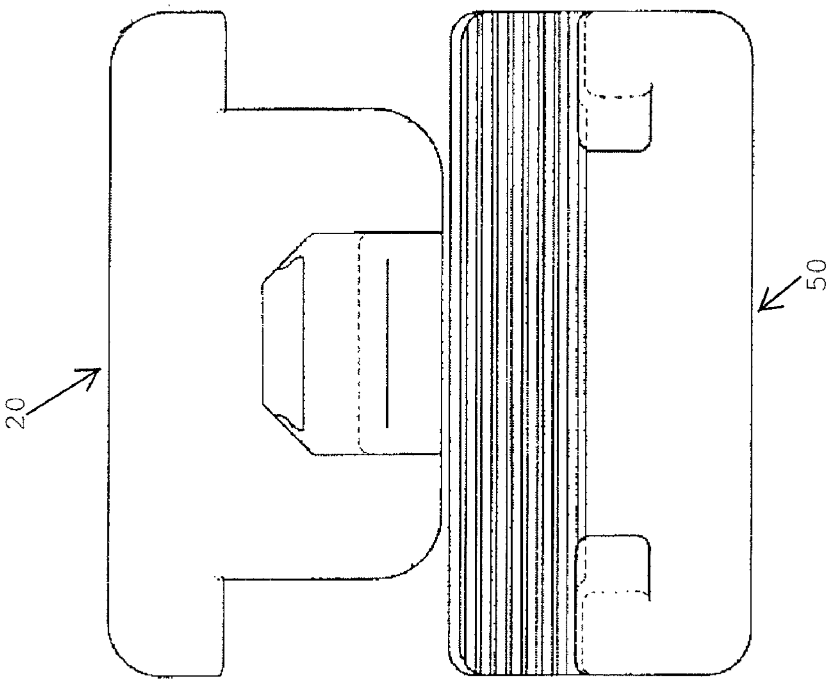
FIG. 9 is a top plan view of the cable pull positioned for insertion into the base plate.
Figure 10:
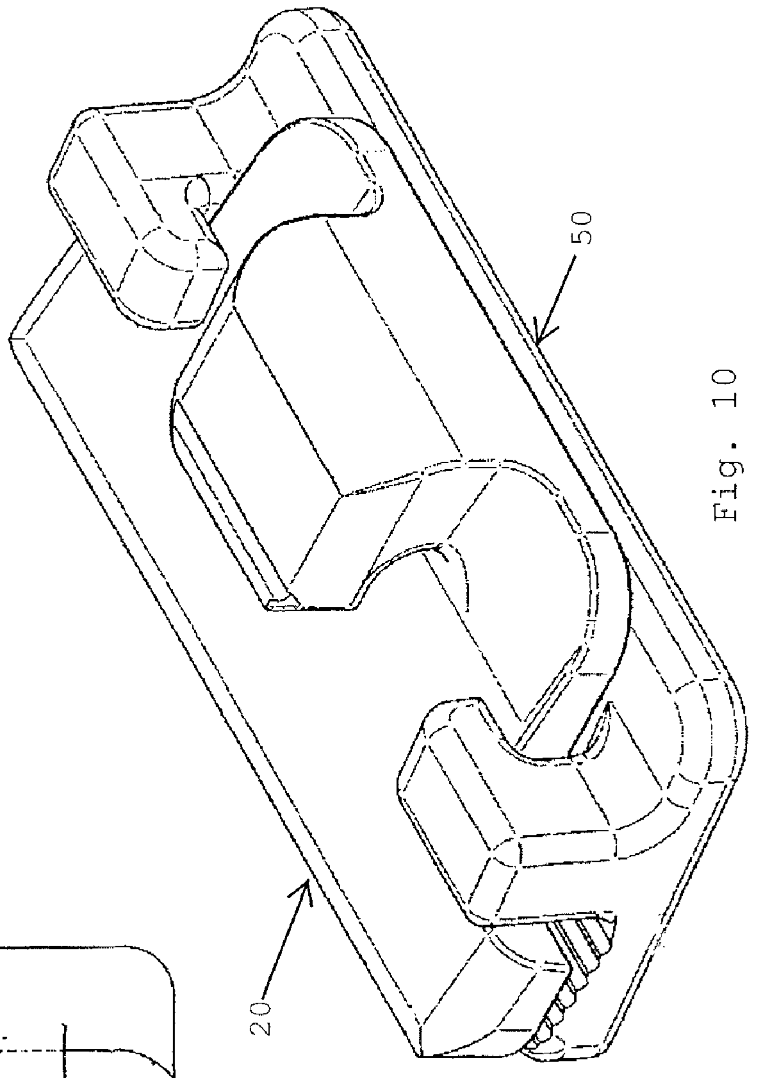
FIG. 10 is a perspective view of the cable pull inserted into the base plate.
Figure 11:
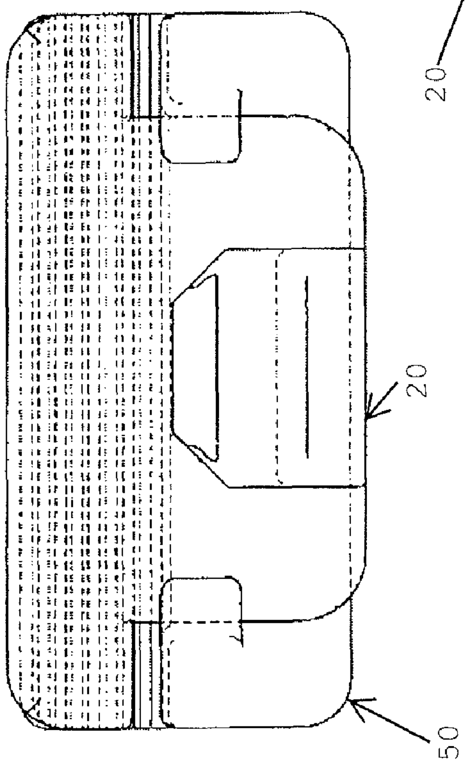
FIG. 11 is a top plan view of the cable pull inserted into the base plate.

FIGS. 5-7 show two angled tensioning arms 54, 56 extending upward from the base plate 50 and facing each other. The arms 54, 56 provide a friction fit with the angled top surface 38 of the cable pull 20. The base plate 50 has a bottom surface 58 and sides 60, 62. A portion of the top surface 52 (proximate to the front edge 64) preferably has a gripping surface, comprising a series of surface irregularities, such as protrusions 66 extending from the first side 60 to the second side 62 (or at least a portion thereof) to provide a friction fit against the bottom surface 38 of the cable pull 20 and to prevent premature separation of the cable pull 20 from the base plate 50, yet still permit separation by manually pulling the two parts apart. The protrusions 66 can be teeth, protrusions, bumps, ribs, ridges, spikes, or the like. Alternatively, the surface irregularities can be grooves, indentations, channels, detents, divots, or the like. Preferably, the protrusions 66 have a relatively sharp edge to engage a vinyl sheet 70 (shown in FIG. 12 and described hereinbelow in greater detail). The base plate 50 also has a rear edge 68. The top surface 52 preferably tapers from the front edge 64 toward the rear edge 68. The tapering may be all the way from edge to edge, or may be tapered along just a portion thereof. The bottom surface 58 preferably tapers at a portion 72 extending from the front edge 64 toward the rear edge 68 (the tapering angle shown in FIG. 7 being exaggerated for easier viewing).

Figure 12:
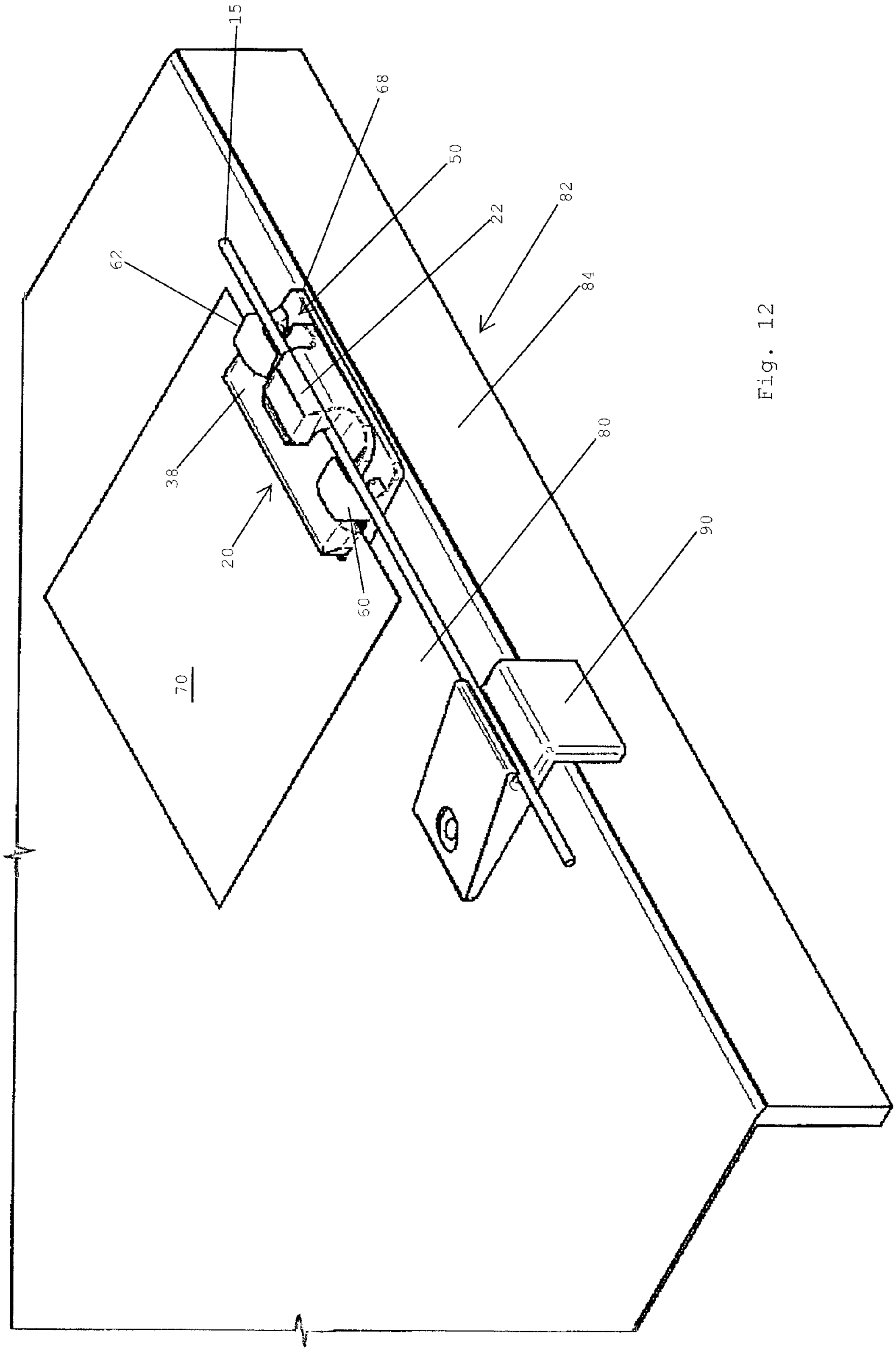
FIG. 12 is a schematic perspective view of the clip apparatus installed on a cable and holding a vinyl sheet in conjunction with a billboard, also showing a guide clip.

In assembly and operation (see FIGS. 8-12), the rear edge 30 of the cable pull 20 is inserted into the base plate 50 with the edge of a vinyl sheet 70 positioned between the cable pull 20 bottom surface 36 and the protrusions 66 of the base plate 50 top surface 52 (see FIG. 12). Hand-applied pressure is applied to the cable pull 20 and the base plate 50 sufficient to lock the clip apparatus 10 onto the edge of the vinyl sheet 70. The arms 54, 56 of the base plate 50 secure the cable pull 20 to the base plate 50 when lateral tension (i.e., in the direction of the front edge 28 toward the back edge 30) is applied to the cable pull 20 through the tightening of the cable 15. The tapered cable pull 20 top surface 38 wedges into the recessed area of the arms 54, 56 to form the tightened fit. The vinyl sheet 70 is stretched on the face 80 of a billboard 82 along the billboard frame edge 84. FIG. 12 also shows a conventional guide clip 90, known to those skilled in the art.

A single worker can install the vinyl sheet 70 after the tensioning system is installed. This is in comparison to the conventional systems, which require several workers. The reduction in time to install the vinyl sheet represents a significant time and expense savings to the installation company.

It is to be understood that the locking clip of the present disclosure can be used or adapted to be used with other types of systems or be used to grip any suitable type of surface, such as, but not limited to, tent fabric, paper, film, cotton or other natural or synthetic fiber (woven or nonwoven material), and the like.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

All patents, patent applications and publications referred to herein are incorporated by reference in their entirety.

What is claimed is:

1. A clip for use in a cable tensioning system, comprising:

a. a base plate comprising i. a top surface having a plurality of surface irregularities, ii. a bottom surface, iii. a front edge and a rear edge, and iv. a pair of opposing tensioning arms extending from said top surface;

b. a top plate engageable by said tensioning arms and comprising i. a top plate top surface, ii. a bottom surface, iii. a front edge and a rear edge, the thickness of at least a portion of said top plate tapering from said front edge toward said rear edge, iv. a hook extending from said top plate top surface proximate to said rear edge, whereby said tensioning arms and said hook define a channel which can removably accommodate a portion of a cable.

2. The clip of claim 1, wherein the thickness of a portion of said base plate tapers from said front edge toward said rear edge.

3. The clip of claim 1, wherein said base plate bottom surface has a portion proximate to said front edge which angles upward toward said top surface.

4. The clip of claim 1, wherein said top plate is sized to engage said base plate tensioning arms and at least a portion of said base plate top surface so as to form a friction fit.

5. The clip of claim 1, wherein said cable is engaged by said clip only by said arms and said hook.

6. The clip of claim 1, wherein said cable is engaged by said clip only by said channel.

7. The clip of claim 1, wherein said clip engages only said substantially flat medium and a single said cable and when so engaged said substantially flat medium engaged by said clip is prevented from twisting with respect to said cable.

8. The clip of claim 1, wherein when said base plate and said top plate are in an engaged but slightly separated relationship defining a first position and said channel loosely engages said cable while permitting generally free lateral movement of said cable within said channel, an edge of a substantially flat medium can be inserted or removed from between a portion of said top plate and said base plate, and wherein when said base plate and said top plate are in an engaged and locked relationship defining a second position and said channel engages said cable, said substantially flat medium can be gripped between said base plate and said top plate and maintained under tension in a substantially flat and unwrinkled state.

9. A clip usable in a cable tensioning system for engaging and removably retaining a portion of a sheet to be stretched to a tensioned cable, the clip comprising:

a. a top plate having a top surface and a bottom surface, said top plate tapering from a front edge to a rear edge;

b. a hook extending upward from said top surface near said rear edge, said hook defining an open channel adapted to receive a portion of said cable;

c. a base plate comprising a bottom surface and a top surface having a gripping surface; and, d. a pair of opposing retaining arms extending upward from said base plate top surface, each arm having an angled portion angled toward the other arm with each angled portion terminating in an end spaced from said base plate top surface, whereby said tapering top plate is adapted to slide over said base plate with said hook passing between said opposing retaining arms and with said ends of said opposing retaining arms being adapted to engage said top plate top surface to lock said top plate against said base plate so as to grip said sheet.

10. The clip of claim 9, wherein said top surface of said base plate is substantially flat.

11. The clip of claim 9, wherein said bottom surface of said top plate and said top surface of said base plate are adapted to engage said sheet so that said sheet may extend in a substantially flat plane between said plates and immediately outward from said plates.

12. The clip of claim 9, wherein said channel is generally U-shaped.

13. The clip of claim 9, wherein said retaining arms are adapted to engage said top plate top surface as a result of said top plate bottom surface sliding on said flat base plate top surface with said taper of said top plate closing the gap between said retaining arm ends and said top plate top surface.

* * * * *